United States Patent [19]

Hovey

[11] 3,839,304
[45] Oct. 1, 1974

[54] SOFT CONTACT LENS AND METHOD OF PRODUCTION THEREOF

[75] Inventor: Richard J. Hovey, Sturbridge, Mass.

[73] Assignee: American Optical Corporation, Southbridge, Mass.

[22] Filed: Feb. 12, 1973

[21] Appl. No.: 331,428

[52] U.S. Cl..... 260/80.72, 260/29.6 R, 260/86.1 N, 260/885, 264/1, 351/160
[51] Int. Cl........................ C08f 15/02, C08f 15/16
[58] Field of Search....... 260/86.1 N, 80.72, 29.6 R; 264/1

[56] References Cited
UNITED STATES PATENTS

| | | | |
|---|---|---|---|
| 3,532,679 | 10/1970 | Steckler | 260/80.72 |
| 3,639,524 | 2/1972 | Seiderman | 264/1 |
| 3,647,736 | 3/1972 | Ewell | 264/1 |
| 3,700,761 | 10/1972 | O'Driscoll | 260/885 |
| 3,721,657 | 3/1973 | Seiderman | 260/86.1 N |

*Primary Examiner*—Harry Wong, Jr.
*Attorney, Agent, or Firm*—Alan H. Spencer; William C. Nealon

[57] ABSTRACT

A mixture of N-vinyl-2 pyrrolidone, a hydroxy alkyl methacrylate ester and the catalyst, cast in a shaping mold is polymerized at a low temperature and then post cured at a higher temperature. The resultant product is more easily machined into contact lenses, may be hydrated to 50–62 percent water content and has a high burst strength.

5 Claims, No Drawings

SOFT CONTACT LENS AND METHOD OF PRODUCTION THEREOF

Graft or block copolymers have heretofore been prepared from polyvinyl pyrrolidone and hydroxy alkyl methacrylate esters with free radical initiators, to produce highly useful soft contact lenses. The polymerization has been conducted in a two-part process (1) at low temperature in the mold, and (2), at a higher temperature out of the mold. This process is set out in detail in U.S. Pat. No. 3,700,761, issued to O'Driscoll et al, issued Oct. 24, 1972. The polymerized polarized product of that invention imbibes water to about 50–55 percent and isotonic solution to about 52–58 percent. Polyvinyl pyrrolidone is a faintly yellow solid, resembling albumin, having a medium molecular weight of about 25,000 to 50,000, with an average molecular weight of about 37,000. For use in the above patent the polyvinyl pyrrolidone is used as a powder, but it is hygroscopic and the water content of the pulverulent polyvinyl pyrrolidone may vary from between 5 and 20 percent depending upon the storage conditions in handling. Therefore, different lots of polyvinyl pyrrolidone used in a production process must, therefore, be analyzed routinely for water content, and allowances made for the water content in the formulations for the polymeric product. The powdered polyvinyl pyrrolidone is dissolved in a portion of hydroxy alkyl methacrylate and the catalysts are dissolved in another portion of the liquid methacrylate. Finally, the liquids are added together with mixing for subsequent curing to produce buttons from which may be made contact lenses. Several hours of mixing are required for complete dissolution of polyvinyl pyrrolidone in hydroxy alkyl methacrylate substantially increasing the time of process and decreasing the efficiency thereof. Also, each batch varies in time of dissolution, adding further problems.

According to the present invention, there is provided a process wherein monomeric N-vinyl pyrrolidone is substituted for polyvinyl pyrrolidone in the casting of soft contact lenses. The N-vinyl pyrrolidone is a liquid which readily mixes with the liquid hydroxy alkyl methacrylate. The mixture may be catalyzed with low and medium high temperature catalysts in a two stage polymerization process. The curing of the N-vinyl pyrrolidone and the hydroxy alkyl methacrylate is performed initially at a low temperature and then at a higher temperature. The monomeric N-vinyl pyrrolidone produces a considerably higher degree of chemical binding with the hydroxy alkyl methacrylate than with the polyvinyl pyrrolidone. This higher degree of chemical binding reduces the possibility of the pyrrolidone moiety extraction from the resultant lens on extended usage. After polymerization, the hard buttons obtained are found to be more easily machinable, and the finished lenses after hydration contain more than 50 percent water, with an average burst strength of above 11 psi. Buttons of a material that hydrate to 55 to 62 percent water are preferred for lens material and sometimes buttons that hydrate to 61 to 62 percent are preferred. The use of the monomeric N-vinyl pyrrolidone is advantageous in batching, since it is a liquid and it mixes readily with the hydroxy alkyl methacrylate. No water absorption band was detected in the near IR spectra of the N-vinyl pyrrolidone. One procedure for determining water content is based on the near IR water absorption band at 1.93 $\mu$. This involves measuring the percent transmittance of the DMSO solution containing 10 percent vinyl pyrrolidone. The percent of water is linearly related to log T (at 1.93 $\mu$).

Therefore, included among the objects and advantages of the present invention is a process of producing a graft or block copolymer suitable for soft contact lenses, etc., by polymerizing a hydroxy alkyl methacrylate ester and N-vinyl pyrrolidone.

Another object of the invention is to provide a product of the polymerization of a hydroxy alkyl methacrylate ester and N-vinyl pyrrolidone.

A further object of the invention is to provide a method of producing a soft contact lens material formed of hydroxy alkyl methacrylate ester and N-vinyl pyrrolidone polymerized at low temperatures.

A still further object of the invention is to provide an improved method of batching N-vinyl pyrrolidone, a hydroxy alkyl methacrylate ester with both low and medium temperature catalysts resulting in a uniform product which hydrates to about 61–62 percent water.

These and other objects and advantages of the invention will be readily apparent by reference to the following description which in particularity sets forth the invention.

In general, the present invention provides a process and product which is the polymeric product of the thermal polymerization of a hydroxy alkyl methacrylate ester and N-vinyl pyrrolidone. The liquid N-vinyl pyrrolidone monomer is mixed with the methacrylate ester and catalysts. The mixture generally is degassed to remove bubbles that might form in the polymerized material. This degassed mixture is initially cured at a low temperature for a substantial period of time and then to a higher temperature for a shorter period of time.

Following specific examples illustrate the process of the invention.

EXAMPLE 1

The following materials were thoroughly mixed in a suitable container to form a prepolymer mixture:

| Components | Weight percent |
|---|---|
| 2-Hydroxy ethyl methacrylate | 78.24 |
| Ethylene dimethacrylate | 0.56 |
| Methacrylic acid | 1.20 |
| N-vinyl pyrrolidone | 20.00 |

The above prepolymer mixture was catalyzed with di (secondary-butyl) peroxy dicarbonate in an amount of 0.3 weight percent, and benzoyl peroxide in 0.3 weight percent. The mixture was degassed and then cured at 51°C. for 16 hours in a polyethylene cup-type mold, and then post-cured at 110°C. for 1.5 hours. The mold is placed in a conventional circulating air oven.

The buttons obtained by the polymerization were found lighter in color and more easily machinable than those obtained using polyvinyl pyrrolidone.

EXAMPLE 2

The process of Example 1 is repeated except that 35% by weight of N-vinyl pyrrolidone was used instead of 20 percent. The resulting lens was similar to that of Example 1.

EXAMPLE 3

The procedure of Example 1 was followed except that 30 percent by weight of N-vinyl pyrrolidone was used to produce a lens which is similar to that of Example 1.

EXAMPLE 4

The process of Example 1 was repeated except that diethylene glycol monomethacrylate was used, and this lens was similar to the lens of Example 1.

The polymerization is carried out with a low temperature initiator and a medium temperature initiator providing the two-stage polymerization levels. The use of both the low and medium temperature initiators provides improved stock for contact lenses.

The buttons formed in the polymerization process are made into contact lenses by cutting and polishing the hardened buttons. The above-identified patent sets forth a cutting and polishing procedure which may be used to produce the soft contact lenses of the material of the present invention.

After cutting and polishing, the lenses are neutralized and hydrated. The step of neutralization-hydration may be conducted by placing the lens in a 0.8 percent saline bath mixed with sufficient bicarbonate of soda to produce a pH of about 8. The lenses are usually maintained in this bath from 2 to 20 hours. Following this treatment, the lenses are then placed in a bath of normal saline at approximately 200°F. for about an hour. The bath is then changed to fresh normal saline solution and the lenses are maintained in this bath for about 3 hours, and then a final change of normal saline bath for an additional 4 hours. The high temperature is maintained under refluxing conditions to prevent evaporation and an increase in the concentration of the saline solution. The hydrated lenses may then be treated with hydrogen peroxide.

After complete treatment, the lenses may be used, and may be maintained by washing in hydrogen peroxide to remove matter accumulated from the eye liquids.

The bursting strength of the lens may be tested by securing a lens over the opening of a ¼ inch pipe, as by binding the edges of the lens to the opening of the pipe. The bursting strength is then measured as the air pressure necessary to burst the lens. As pointed out above, the bursting strength of the lens is above about 11 psi.

Various methacrylates may be used with the N-vinyl pyrrolidone, and these generally are monomethacrylate esters of a glycol selected from the group consisting of ethylene glycol, propylene glycol, diethylene glycol and dipropylene glycol. These esters are preferably distilled immediately prior to formulation with the N-vinyl pyrrolidone, so as to be essentially pure.

The catalysts which may be used include low temperature peroxides, such as acetyl peroxide, di-secondary butyl peroxy dicarbonate, cyclohexanone peroxide, etc., and such medium temperature initiators as benzoyl peroxide, diethyl peroxide, azo isobutyronitrile, orthotolyl peroxide, etc. The low temperature cure of 40°–60°C. is conducted for 10-40 hours and preferably about 20 hours. The high temperature cure of 80°–120°C. is conducted for ½–5 hours, preferably about 1 ½ hours.

In the preferred form, the monomethacrylate ester that is used may contain few impurities to produce clear polymers. Generally, the ester is a liquid and is distilled immediately preceding the batching. The freshly distilled monomeric liquid should contain less than about 1.5 percent of methacrylic acid and less than about 0.75 percent of ethylene dimethacrylate (when 2-hydroxyethyl methacrylate is used) or other dimethacrylate when other monomethacrylate ester is used. The N-vinyl pyrrolidone is a liquid and is miscible with the methacrylate monomer. This provides a system which may be thoroughly mixed in a minimum of time, thus easier and very accurate batching. The initiators are used in a catalytic quantity to produce the necessary polymerization. This is usually less than about 0.5 weight percent of the initiator and preferably in the range of 0.1–0.3 weight percent.

What is claimed is:

1. A method of forming a hygroscopic polymerized material suitable for soft contact lenses or the like, comprising mixing from 20–45 weight percent of N-vinyl-2-pyrrolidone with about 80–55 weight percent of a monomethacrylate ester of a glycol selected from the group consisting of ethylene glycol, propylene glycol, diethylene glycol and dipropylene glycol, there being no more than about 1.5 weight percent of methacrylic acid and no more than about 0.75 weight percent of a dimethacrylate of said glycol; and low and medium temperature initiators; said low temperature initiator being effective in the range of 40°–60°C. and said medium temperature initiator being effective in the range of 80°–120°C.; casting said mix in molds; curing said mix at 40°–60°C. for from 10–40 hours; and then curing the resultant mix at 80°–120°C. for from ½ to 5 hours.

2. A method according to claim 1, wherein said low temperature initiator is di(secondary-butyl) peroxy dicarbonate and said medium temperature initiator is benzoyl peroxide.

3. The method of claim 1, wherein 2-hydroxyethyl methacrylate is mixed with N-vinyl pyrrolidone.

4. The method of claim 1, wherein about 0.3 weight percent of di(secondary-butyl) peroxy dicarbonate is the low temperature initiator and about 0.3 weight percent of benzoyl peroxide is the medium temperature initiator.

5. The method of claim 1, wherein about 78.24 weight percent of 2-hydroxyethyl methacrylate is mixed with about 20.00 weight percent of N-vinyl pyrrolidone containing not more than about 1.20 weight percent of methacrylic acid and not more than about 0.56 weight percent of ethylene dimethacrylate.

* * * * *